United States Patent [19]

Andrä et al.

[11] Patent Number: 5,766,675
[45] Date of Patent: Jun. 16, 1998

[54] METHOD FOR MANUFACTURING FLEXIBLE DISKS

[75] Inventors: Rainer Andrä, Limburg; Anton Hingerl, Tüssling; Wolfgang Nindel, Mühldorf, all of Germany

[73] Assignee: SGF Süddeutsche Gelenkscheibenfabrik GmbH & Co. KG, Germany

[21] Appl. No.: 817,661

[22] PCT Filed: Oct. 18, 1995

[86] PCT No.: PCT/EP95/04098

§ 371 Date: Apr. 22, 1997

§ 102(e) Date: Apr. 22, 1997

[87] PCT Pub. No.: WO96/12898

PCT Pub. Date: May 2, 1996

[30] Foreign Application Priority Data

Oct. 24, 1994 [DE] Germany ............... 44 37 989.7

[51] Int. Cl.⁶ ................................................ B05D 5/12
[52] U.S. Cl. ........................ 427/104; 427/177; 427/372.2; 427/413; 427/434.6; 464/69; 474/202
[58] Field of Search .................... 464/51, 69, 87, 464/93, 94, 96, 902, 903; 59/78; 474/202; 74/105, 572, 574; 427/104, 177, 372.2, 413, 434.6

[56] References Cited

U.S. PATENT DOCUMENTS

| | | | |
|---|---|---|---|
| 1,483,561 | 2/1924 | Ungar | 464/69 |
| 1,676,333 | 7/1928 | Kattwinkel | 464/69 |
| 2,157,093 | 5/1939 | Bemis | 464/69 |
| 4,118,952 | 10/1978 | Kobayashi | 464/69 |
| 4,588,388 | 5/1986 | Chivari | 464/69 |
| 4,738,650 | 4/1988 | Hojo et al. | 464/69 |
| 4,804,352 | 2/1989 | Schmidt | 464/69 |
| 5,163,876 | 11/1992 | Zilberman et al. | 464/69 |
| 5,186,686 | 2/1993 | Staples et al. | 464/69 |

FOREIGN PATENT DOCUMENTS

| | | |
|---|---|---|
| 2636386 | 3/1990 | France. |
| 4304274 | 3/1994 | Germany. |
| 752815 | 7/1956 | United Kingdom. |
| 2082716 | 3/1982 | United Kingdom. |
| 9214597 | 9/1992 | WIPO. |

*Primary Examiner*—Shrive Beck
*Assistant Examiner*—Brian K. Talbot
*Attorney, Agent, or Firm*—Webb Ziesenheim Bruening Logsdon Orkin & Hanson, P.C.

[57] ABSTRACT

A method of forming flexible disks containing annular loop packets for the purpose of transmitting traction forces between fastening elements is disclosed. The loop packets and the fastening elements are combined into a ring and subsequently embedded in rubber-elastic material. In a preparatory operation, the loop packets are injection-coated either individually or in groups by a coating of elastomer material, which defines and stabilizes their outer contour. The elastomer material is only partially vulcanized before the ring is completely embedded in the rubber-elastic material. Injection coating renders the loop packets or groups of loop packets into components which are true to shape and size with defined wall thicknesses. Consequently, the characteristics and the life of the flexible disks are standardized for mass production and material consumption is reduced.

15 Claims, 1 Drawing Sheet

METHOD FOR MANUFACTURING FLEXIBLE DISKS

BACKGROUND OF THE INVENTION

1. Field of the Invention

The invention relates generally to a method for manufacturing flexible disks with annular loop packets for the transmission of traction forces.

2. Description of the Prior Art

Loop packets for flexible disks are usually wound from threads or strips which are then impregnated in liquid rubber which is cured but not vulcanized. The loop packets are then placed into a die in which they are attached to fastening means, in particular sleeves or rivets, and then commonly embedded in a rubber-elastic material which is then vulcanized. Although it is common practice to limit the space which is occupied by the loop packets in an axial direction prior to filling the die with rubber-elastic material by means of washers which, e.g. can be brought into engagement with the fastening means (DE 43 04 274 C1), this, however, enables only a rough definition of the shape and position of the loop packets over the major part of their length, in particular in their essentially straight portions. Due to variations in the manufacturing method, enveloping wall thicknesses are produced which range in the order of the cross-sectional dimensions of the loop packets. In addition, corresponding variations in the functional parameters (e.g. characteristics and life) of the flexible disks will result.

It is known (WO 92/14 597) to manufacture flexible disks in such a manner that sleeves serving as fastening means and, if required, other rigid parts, are combined with a skeleton by means of a plastic material injection apparatus, which is then embedded in injected caoutchouc which is subsequently vulcanized. Thereby, the conventional winding and inserting of loop packets is to be omitted in that these are replaced by the plastic skeleton. There are, however, many applications where loop packets cannot be dispensed with. This applies in particular to flexible disks in the drive train as well as in the steering linkage of motor vehicles.

It is therefore an object of the invention to develop a method of the initially mentioned generic type in such a manner that the wall thickness of the rubber-elastic material into which the loop packets are embedded and which is finally vulcanized can be reduced.

SUMMARY OF THE INVENTION

According to the invention, the object is solved by a method for manufacturing flexible disks with annular loop packets for the transmission of traction forces between fastening means in which the loop packets and the fastening means are combined into a ring and embedded in a rubber-elastic material. The loop packets are at least partially injection-coated by a coating of elastomeric material which defines and stabilizes at least an outer contour of the loop packets. The elastomeric material is at most partially vulcanized before the ring is completely embedded in the rubber-elastic material.

The loop packets are preferably first injection-coated with thermoplastic or elastic material either individually or in groups in a die which is of a complementary shape with respect to their outer geometry, taking into consideration manufacturing tolerances. With an appropriate configuration of the die, locally different materials can be employed and/or only parts of the loop packets can be injection-coated. In any case, by injection coating, the loop packets or groups of loop packets which may form a complete ring become components which are true to shape and size with defined wall thicknesses which may be on the order of the thread diameter of the loop packets. This results in a standardization of the characteristics and life of the flexible disk as well as a reduction in material consumption.

Advantageous further development of the invention will become apparent from the dependent claims.

BRIEF DESCRIPTION OF THE DRAWINGS

Embodiments of the invention will be explained in the following description in more detail with reference to the schematic drawings, each of which is a perspective view of.

DESCRIPTION OF THE PREFERRED EMBODIMENT

Figure 1:
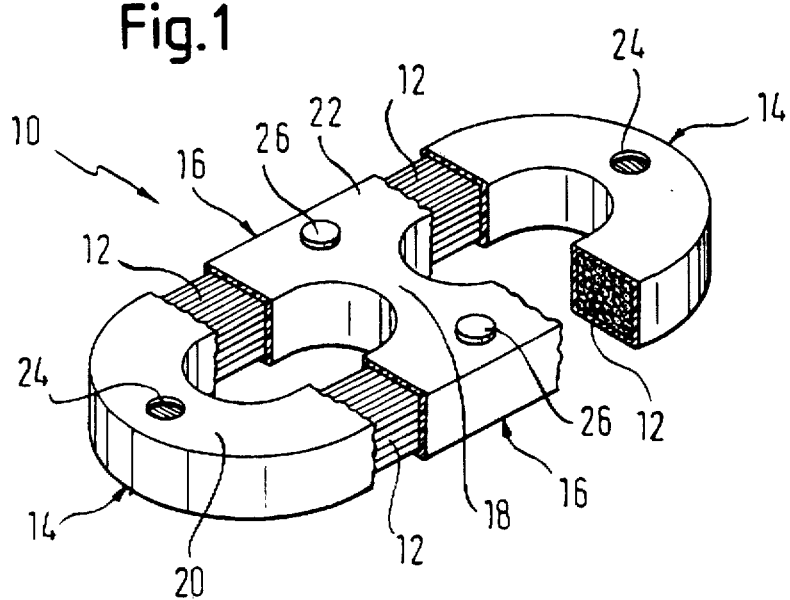
FIG. 1 a single loop packet.

A loop packet 10 shown in FIG. 1 is wound from threads 12 and is configured as an elongated oval element. The loop packet 10 comprises two semi-circular end portions 14 which are connected to each other by means of straight central portions 16. The two central portions 16 are connected to each other by means of a transverse bridge 18.

The loop packet 10 has been positioned and partially injection-coated in a die (not shown) whereby the loop packet in its two semi-circular end portions 14 has been provided with an injection coating 20 and in its straight central portions 16 with a coating 22 which simultaneously forms the bridge 18. As can be seen from the example of the coatings 20, the injection-coating process has left indentations 24 in those areas where the loop packet 10 has been positioned by means of internal protrusions of the die. Moreover, the injection-coated loop packet 10 comprises projections 26, as can be seen from the example of the coating 22, which serve as a material reserve and for the later positioning of the injection-coated loop packet 10 in a die in which the subsequent vulcanization is to take place.

Figure 2:
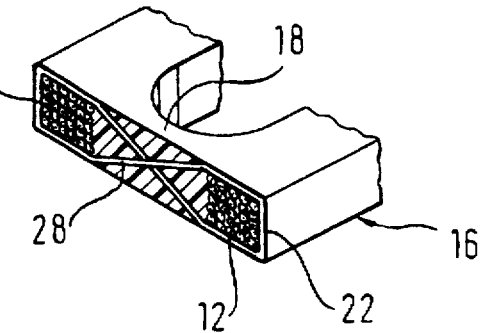
FIG. 2 a sectional view of part of the loop packet shown in FIG. 1.

As can be seen from FIG. 2, the bridge 18 can comprise a transverse reinforcement 28 which is made from thread, wire or strip material and which is suitably arranged in a cross-type manner, as shown.

Figure 4:
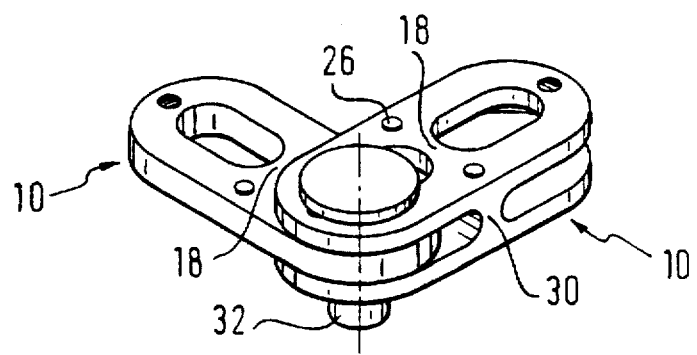
FIG. 4 three commonly injection-coated loop packets, two of which are superposed.

In a manner similar to that where the straight central portions 16 of one and the same loop packet 10 can be connected to each other by means of the bridge 18, the straight central portions 16 of two essentially congruent superposed loop packets 10 can be connected to each other by means of a web 30 as shown in FIG. 4, which is formed during the common injection coating of these two loop packets and which can also comprise a reinforcement similar to the transverse reinforcement 28.

Figure 3:
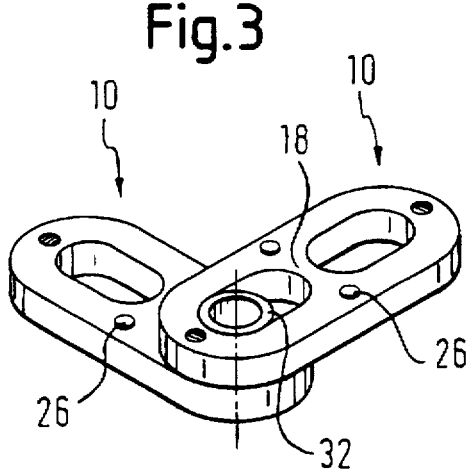
FIG. 3 two interconnected loop packets.

The loop packets 10 which have been injection-coated in this manner either individually or in pairs or in larger groups in a superposed relationship are connected to each other according to FIGS. 3 and 4 by means of fastening means 32 which serve for a later attachment of the finished flexible disk to shaft flanges. According to FIG. 3 sleeves or, according to FIG. 4, rivets, can be provided as fastening means.

We claim:

1. A method for manufacturing a flexible disk having a plurality of annular loop packets for the transmission of traction forces, comprising the steps of:

injection coating at least a portion of the loop packets at least one of individually and in groups with a coating of an elastomeric material, which coating defines and stabilizes at least an outer contour of the loop packets;

combining the loop packets with fastening means to form a ring;

at most partially vulcanizing the elastomeric material coating; and embedding the ring of loop packets in a rubber-elastic is material.

2. The method according to claim 1, wherein each loop packet includes substantially semi-circular end portions and the method includes injection coating the substantially semi-circular end portions of the loop packets with the elastomeric material coating.

3. The method according to claim 1, wherein each loop packet includes substantially straight central portions and the method includes injection coating the substantially straight central portions of the loop packets with the elastomeric material coating such that the central portions are connected to each other by means of at least one bridge.

4. The method according to claim 3, wherein the substantially straight central portions of the loop packets are connected by a transverse reinforcement prior to injection coating.

5. The method according to claim 1, wherein each loop packet includes substantially straight central portions and wherein at least two substantially congruent loop packets in a superimposed relationship are simultaneously injection-coated with the elastomeric material and thereby connected to each other at the straight central portions by at least one web.

6. The method according to claim 1, including forming an accumulation of elastomeric material on the elastomeric material coating for positioning the loop packets when they are embedded in the rubber-elastic material and to act as an elastomeric material reserve to prevent voids.

7. The method according to claim 2, wherein each loop packet includes substantially straight central portions and the method includes injection coating the substantially straight central portions of the loop packets with the elastomeric material coating such that the central portions are connected to each other by at least one bridge.

8. The method according to claim 2, wherein each loop packet includes substantially straight central portions and wherein at least two substantially congruent loop packets in a superimposed relationship are simultaneously injection-coated with the elastomeric material and thereby connected to each other at the straight central portions by at least one web.

9. The method according to claim 3, wherein each loop packet includes substantially straight central portions and wherein at least two substantially congruent loop packets in a superimposed relationship are simultaneously injection-coated with the elastomeric material and thereby connected to each other at the straight central portions by at least one web.

10. The method according to claim 4, wherein each loop packet includes substantially straight central portions and wherein at least two substantially congruent loop packets in a superimposed relationship are simultaneously injection-coated with the elastomeric material and thereby connected to each other at the straight central portions by at least one web.

11. The method according to claim 8, including forming an accumulation of elastomeric material on the elastomeric material coating for positioning the loop packets when they are embedded in the rubber-elastic material and to act as an elastomeric material reserve to prevent voids.

12. The method according to claim 9, including forming an accumulation of elastomeric material on the elastomeric material coating for positioning the loop packets when they are embedded in the rubber-elastic material and to act as an elastomeric material reserve to prevent voids.

13. The method according to claim 10, including forming an accumulation of elastomeric material on the elastomeric material coating for positioning the loop packets when they are embedded in the rubber-elastic material and to act as an elastomeric material reserve to prevent voids.

14. The method according to claim 11, including forming an accumulation of elastomeric material on the elastomeric material coating for positioning the loop packets when they are embedded in the rubber-elastic material and to act as an elastomeric material reserve to prevent voids.

15. A method for manufacturing a flexible disk having a plurality of annular loop packets for the transmission of traction forces, comprising the steps of:

combining a plurality of loop packets to form a ring;

injection coating the ring with a coating of an elastomeric material in a die having a shape complementary to a shape of the loop packets, which coating defines and stabilizes at least an outer contour of the loop packets; and embedding the ring of loop packets in a rubber-elastic material.

* * * * *

UNITED STATES PATENT AND TRADEMARK OFFICE
CERTIFICATE OF CORRECTION

PATENT NO. : 5,766,675
DATED : June 16, 1998
INVENTOR(S) : Rainer Andrä, Anton Hingerl and Wolfgang Nindel It is certified that error appears in the above-identified patent and that said Letters Patent is hereby corrected as shown below:

Claim 1 Column 3 Line 9 after "rubber-elastic" delete --is--.

Claim 11 Column 4 Line 16 "according to claim 8" should read --according to claim 2--.

Claim 12 Column 4 Line 21 "according to claim 9" should read --according to claim 3--.

Claim 13 Column 4 Line 26 "according to claim 10" should read --according to claim 4--.

Claim 14 Column 4 Line 31 "according to claim 11" should read --according to claim 5--.

Signed and Sealed this

Eighth Day of December, 1998

Attest:

Attesting Officer

BRUCE LEHMAN

Commissioner of Patents and Trademarks